(12) United States Patent
Haartsen

(10) Patent No.: US 6,925,096 B2
(45) Date of Patent: Aug. 2, 2005

(54) METHOD AND APPARATUS FOR MANAGING TRAFFIC FLOWS

(75) Inventor: Jacobus Haartsen, Hardenberg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 777 days.

(21) Appl. No.: 09/852,114

(22) Filed: May 9, 2001

(65) Prior Publication Data
US 2002/0036986 A1 Mar. 28, 2002

Related U.S. Application Data

(60) Provisional application No. 60/234,361, filed on Sep. 22, 2000.

(51) Int. Cl.[7] .................................................. H04J 3/24
(52) U.S. Cl. ....................................... 370/473; 370/235
(58) Field of Search ................................ 370/276, 389, 370/395.65, 395.52, 351–3, 458, 469, 474, 500–503, 504–20

(56) References Cited

U.S. PATENT DOCUMENTS

| | | | |
|---|---|---|---|
| 6,345,302 B1 * | 2/2002 | Bennett et al. | 709/236 |
| 6,360,271 B1 * | 3/2002 | Schuster et al. | 709/231 |
| 6,532,217 B1 * | 3/2003 | Alkhatib et al. | 370/252 |
| 2002/0035681 A1 * | 3/2002 | Maturana et al. | 713/151 |

FOREIGN PATENT DOCUMENTS

| | | |
|---|---|---|
| EP | 0973 294 A2 | 1/2000 |
| WO | WO 98 42108 A1 | 9/1998 |

OTHER PUBLICATIONS

Stevens, TCP/IP Illustrated, 1994, vol. 1, PP: 148–9, 267–269.*

Newton's Telecom Dictionary, 1996, 10th edition, PP: 640.*

Black, ATM Foundation for Broadband Networks, 1995, Prentice Hall, PP: 37, 112, 122, 126, 349.*

Stallings, Data and Computer Communications, 1997, Prentice Hall, 140–143.*

Bertsekas et al. "Data Networks", Prentice–Hall, Inc., 1992, 2nd Edition (ISBN 0–13201674–5), pp. 64–86.

Akyildiz, Ian and Inwhee, Joe, "A New ARQ Protocol for Wireless ATM Networks" IEEE, 1998, pp. 1109–1113.

Mohamed K.A. and Pap, Laszlo, Selective Reject Frequency–Hopped Spread–Spectrum Networks, IEEE, 1996, pp. 2153–2156.

* cited by examiner

*Primary Examiner*—David Vincent
(74) *Attorney, Agent, or Firm*—Potomac Patent Group PLLC

(57) ABSTRACT

Method and apparatus for transferring a plurality of messages over a common information carrying medium, each message having at least one segment, are provided. A message lifetime is defined for each of the respective messages. A respective segment number is then assigned to each segment of a same message in order of a predefined sequence of segment numbers, the segment number defining a position of a corresponding segment within the same message. In addition, a respective message number is assigned to each of the messages in order of a predefined sequence of message numbers, each message number being assigned to at least one segment of a same message. Finally, at least one segment of each respective message is transmitted over the medium at least once having any assigned segment and message numbers included therein until the message lifetime associated with the respective message expires.

42 Claims, 8 Drawing Sheets

METHOD AND APPARATUS FOR MANAGING TRAFFIC FLOWS

RELATED APPLICATIONS

This application claims priority under 35 U.S.C. § 119(e) to Application No. 60/234,361 filed in United States on Sep. 22, 2000, the entire content of which is hereby incorporated by reference.

BACKGROUND

This invention relates generally to a method and apparatus for managing generalized traffic flows. More specifically, this invention relates to a method and apparatus for managing the flow of asynchronous, synchronous, and isochronous information over a common information carrying medium.

The past decade has brought the convergence of telephony and data communications systems. Prior to this period, conventional telephony systems concentrated on establishing voice links between persons, while conventional data communication systems were limited to the sharing of information between computer networks. With the advent of personal computers and other personal electronic devices such as wireless telephones and pagers, the information exchanged between persons today has become a combination of voice, data, and video, or so-called multimedia information.

Today's information service providers (ISPs) are developing solutions to deliver multimedia information, including Internet data services, telephone services, and TV services, directly to customers' premises. It is preferred that the data for these various multimedia services be carried to customer premises over the same medium, such as a TV coaxial cable, telephone cable, or the over air (or wireless). Thus, modern communication channels must be able to combine all types of multimedia traffic flow onto the same carrier.

The various multimedia services typically employ different information protocols, which in turn require that the data transmitted using these protocols exhibit certain characteristics. A problem associated with integrating these services for transmission over the same medium is that while each of the services may impose varying limitations on the degree of data integrity, the applications using these various services may require different levels of data integrity. These application-specific requirements may impose overall lesser or greater constraints on the data integrity than do the services themselves.

For example, synchronous services typically do not allow for any delay variations to occur in the data delivery. The synchronous information delivery is often governed by strict timing requirements. Yet, the types of applications that often require synchronous services, e.g, voice communication, can nevertheless tolerate a certain amount of data loss. Thus, if voice data cannot be delivered according to the timing regime of the synchronous service carrying the data, the data may occasionally be discarded without adversely affecting the overall quality of the voice transmission.

The timing constraints associated with isochronous services are somewhat more relaxed than those associated with synchronous services. For example, as long as the information carried by the isochronous services is delivered within a certain time window, the performance of the service is deemed acceptable. The timing windows themselves, however, are strictly time-bounded. Even though the timing constraints are somewhat more relaxed, certain applications using isochronous services, e.g., video transmission, may actually be more sensitive to data loss than applications using the more rigid synchronous services, e.g., voice communication. Nevertheless, it may be necessary to accept some degree of data loss in these data sensitive applications in order to avoid exceeding the time window borders which may have an overall greater detrimental effect on the isochronous transmission.

Finally, with asynchronous services, the transmitted data typically need not meet any strict timing requirements. In contrast, however, the applications that often use asynchronous services, e.g., file transfer and other types of pure data delivery, require 100% data integrity. That is, no errors or loss of data are allowed in the received transmission.

When each of these different types of multimedia services are integrated for transmission over a shared medium, the traffic flows on this shared medium can be divided into three categories: synchronous traffic, asynchronous traffic, and isochronous traffic. Although there exists a need for a technique for combining and managing these different traffic flows on a common shared medium, techniques have been developed to support each of these different traffic flow types individually on dedicated media.

For example, Asynchronous Transfer Mode, or ATM, has been developed to support wired traffic flows of multimedia information. In ATM systems, the traffic flows are transported in short packets. Packets from the different sources in an ATM network are combined onto a shared medium which uses time slots to carry the individual packets of data.

Other examples include wireless systems based on either Time Division Multiple Access (TDMA) technology, including GSM, D-AMPS, or DECT systems, or wireless systems based on general time slotting techniques, such as Bluetooth™ or HIPERLAN/2. These wireless based systems divide the time axis into time slots which are used to carry information over the shared medium. Several communication channels are combined onto the shared medium by placing each of the channels into a different time slot. These time-slotted systems are particularly suited to support the transfer of multimedia traffic. Special characteristics could be assigned to the different time slots such that the different traffic flows could be supported, even when these time slots belong to the same shared medium.

As discussed above, the three categories of traffic flows differ by the timing constraints placed on the data carried in a respective flow. Synchronous traffic, for example, is characterized by a strictly time-bounded, continuous, real-time flow of information. A typical example of synchronous traffic is a voice stream produced by a speaking user. The synchronous flow does not allow for any delay variations to occur in the data transmission. However, because a synchronous flow is quickly outdated (i.e., the value of information to the recipient has only a limited life span), a certain amount of errors in the traffic flow can be tolerated, as new information is constantly entering the traffic flow. Thus, if errors occur in the synchronous flow, they may be corrected, e.g., by using forward-error-correcting (FEC) parity bits added to the information stream. Alternatively, if no FEC is applied to the stream, other redundant information in the stream may be used. However, in conventional synchronous flows, the recipient of data cannot request a retransmission of that data to correct errors, since this would introduce delay variations which cannot be tolerated in a synchronous flow.

In contrast, asynchronous traffic is not time-bounded. The time allowed to transfer asynchronous information to the recipient is unlimited. A common example of data in an asynchronous traffic flow is the transfer of an email message or of a file. Typically, the recipient is not continuously waiting for this information, but instead is informed when the message has arrived. Unlike synchronous traffic, the information in an asynchronous flow is not contained in a stream, but rather is transferred in blocks of data, e.g., a piece of text, or a photograph. Although errors in these data blocks typically cannot be tolerated, because delay variations present no problems in asynchronous flow, the recipient can check the data for errors and request a retransmission of data from the sender for those data blocks that contain errors.

Finally, in between the pure synchronous and pure asynchronous traffic flows, is the isochronous traffic flow, where a sender has a limited opportunity to retransmit erroneous data blocks. Like the data in a synchronous flow, information contained in an isochronous flow has a certain lifetime. During a limited time window, a data block can be re-transmitted as often as desired (provided channel capacity is available). If, however, the limited lifetime has expired, the data block must be discarded, and the next block is considered, again for a limited lifetime.

From this, it can be recognized that both synchronous and asynchronous traffic flows are special forms of the isochronous traffic flow. For example, as the lifetime of a data block is reduced (i.e., a lesser number of re-transmissions being possible), the traffic flow will resemble more and more a synchronous traffic flow. In the extreme, when the lifetime is reduced to the point where a data block can only be sent once (i.e., no re-transmissions are possible), the traffic becomes synchronous. At the other extreme, as the lifetime of a data block increases, the number of re-transmissions increases and in the extreme, the traffic flow resembles an asynchronous traffic flow. Thus, by controlling the lifetime of the data blocks, the information sender can dynamically change the characteristics of an isochronous traffic flow to resemble either a synchronous flow or an asynchronous flow.

Numerous conventional automatic retransmission query (ARQ) schemes have been developed as described in the text "Data Networks" by Bertsekas and Gallager, Prentice-Hall, Inc., 1992 (ISBN 0-13201674-5). These conventional schemes typically operate by fragmenting the traffic flow into segments; each segment being assigned a respective sequence number. Using the sequence numbers, the recipient can then re-order the various segments that have arrived, and can detect those segments that may be missing from the transmission (e.g., resulting from errors on the channel), and which require re-transmissions.

ARQ schemes are commonly used for addressing data integrity issues in asynchronous services. With asynchronous services, re-transmissions may be carried out whenever a segment of data is not received correctly. ARQ schemes may also be used in conjunction with isochronous services. With these services, the segments of a data block, or message, having errors may be re-transmitted as long as the lifetime associated with the data block or message has not expired. When the time window associated with a received segment has passed, however, and the segment still requires to be re-transmitted as a result of errors in the data, the sender must abort the retransmission and continue the data reception in the next window. Therefore, it is desirable to implement ARQ schemes that can be separately applied for any given time window.

An issue that must be addressed when applying ARQ schemes to the various traffic flow types concerns the ARQ initialization process. For an asynchronous service, there can be an initialization process at the beginning of the session. In this case, both the sender and recipient of the asynchronous flow are informed of the initial conditions prior to information transmission. For isochronous services, however, the initialization must be applied at the start of each new window. Indeed, the ARQ scheme initialization process becomes of greater and greater importance as the message lifetime decreases. Therefore, an efficient method of initialization of the ARQ scheme, capable of functioning within these varying traffic flows is required.

As described earlier, it is recognized that the asynchronous, isochronous, and synchronous traffic flows can be interrelated using the concept of a lifetime (or existence window) associated the data carried in these traffic flows. The respective services using these various traffic flows may thus be generalized using the segment lifetime as a parameter in the ARQ scheme. For asynchronous services, the lifetime is infinite, and the number of available re-transmissions is unlimited. With isochronous services, however, the lifetime is fixed and the number of available re-transmissions is restricted, accordingly. Finally, for synchronous services, the lifetime is zero and the number of available re-transmissions is zero.

SUMMARY

It is therefore an object of the present invention to provide a generalized methodology for supporting asynchronous, synchronous, and isochronous services by efficiently managing the respective traffic flows for these services carried on a common information medium.

According to the invention, this and other objects are met by a method and apparatus for transferring a plurality of messages over a common information carrying medium, each message having at least one segment.

According to an exemplary embodiment, a message lifetime is defined for each of the respective messages. A respective segment number is assigned to each segment of a same message in order of a predefined sequence of segment numbers, the segment number defining a position of a corresponding segment within the same message. In addition, a respective message number is assigned to each of the messages in order of a predefined sequence of message numbers, each message number being assigned to at least one segment of a same message. Finally, at least one segment of each respective message is transmitted over the medium at least once having any assigned segment and message numbers included therein until the message lifetime associated with the respective message expires.

According to other exemplary embodiments, at least one of the transmitted segments includes a re-transmitted segment that had not been correctly received during a previous transmission. The at least one re-transmitted segment is transmitted in response to an automatic retransmission query scheme based on the assigned segment number. The automatic retransmission query scheme may employ one of a stop-and-wait protocol, a go-back-N protocol, and a selective-repeat protocol. Finally, at least one re-transmitted segment is determined to have been not correctly received using at least one of forward error correcting parity bits and redundant information added to the transmitted segments.

According to another exemplary embodiment, transmitted segments are received and the message and segment numbers are extracted. Error checking is performed to detect errors in the received segments. An automatic retransmission query scheme is initiated when an erroneous segment is detected to request a retransmission of the erroneous segment. A current message number is compared with a preceding message number of an immediately preceding received segment. The received segments are grouped and ordered to form a message, using the extracted message and segment numbers, respectively, when the current message number does not match the preceding message number. A determination is made as to whether the message has been received completely. When the message is received completely, it is released. When the message is not received completely, the message is released with an indication that the message is incomplete. The automatic retransmission query scheme may use the segment number to identify a detected erroneous segment.

According to yet another exemplary embodiment, the message lifetime may be dynamically changed when the time associated with a successful transmission of at least one previously transmitted message is different than the message lifetime. When the time associated with the transmission of one segment is substantially equal to the message lifetime, a synchronous transmission is performed. When the time associated with the transmission of all of the segments of message is less than the message lifetime, an isochronous transmission of the message is performed. Finally, an asynchronous transmission results when there exists an infinite message lifetime to transmit the segments of a given message.

According to yet another exemplary embodiment, a message number is assigned to only a frame header segment for each respective message. Transmitted segments are received, including frame header segments. The segment numbers are extracted from the received segments, and the message numbers are extracted from the received frame header segments. Error checking is performed to detect errors in the received segments. An automatic retransmission query scheme is initiated when an erroneous segment is detected to request a retransmission of the erroneous segment. A current message number of a received frame header segment is compared with a preceding message number of an immediately preceding received frame header segment. A message lifetime counter is reset when the current message number does not match the preceding message number. The received segments are ordered to form a message using the extracted segment when the message lifetime counter is reset. A determination is made as to whether the message has been received completely. When the message is received completely, it is released. When the message is not received completely, the message is released with an indication that the message is incomplete.

According to yet another exemplary embodiment, the released message is deleted when there is an indication that the message is incomplete.

According to yet another exemplary embodiment, received segments of a respective message are discarded when the message lifetime counter exceeds a message lifetime associated with the respective message before a frame header having a new message number is received.

According to yet another exemplary embodiment, untransmitted segments of a respective message are discarded when the message lifetime associated with the respective message expires.

BRIEF DESCRIPTION OF THE DRAWINGS

The features, objects, and advantages of the invention will become apparent by reading this description in conjunction with the accompanying drawings, in which like reference numerals refer to like elements and in which.

DETAILED DESCRIPTION

It should be understood that the following description, while indicating preferred embodiments of the invention, is given by way of illustration only since various changes and modifications within the scope of the invention will become apparent to those skilled in the art.

Figure 5:
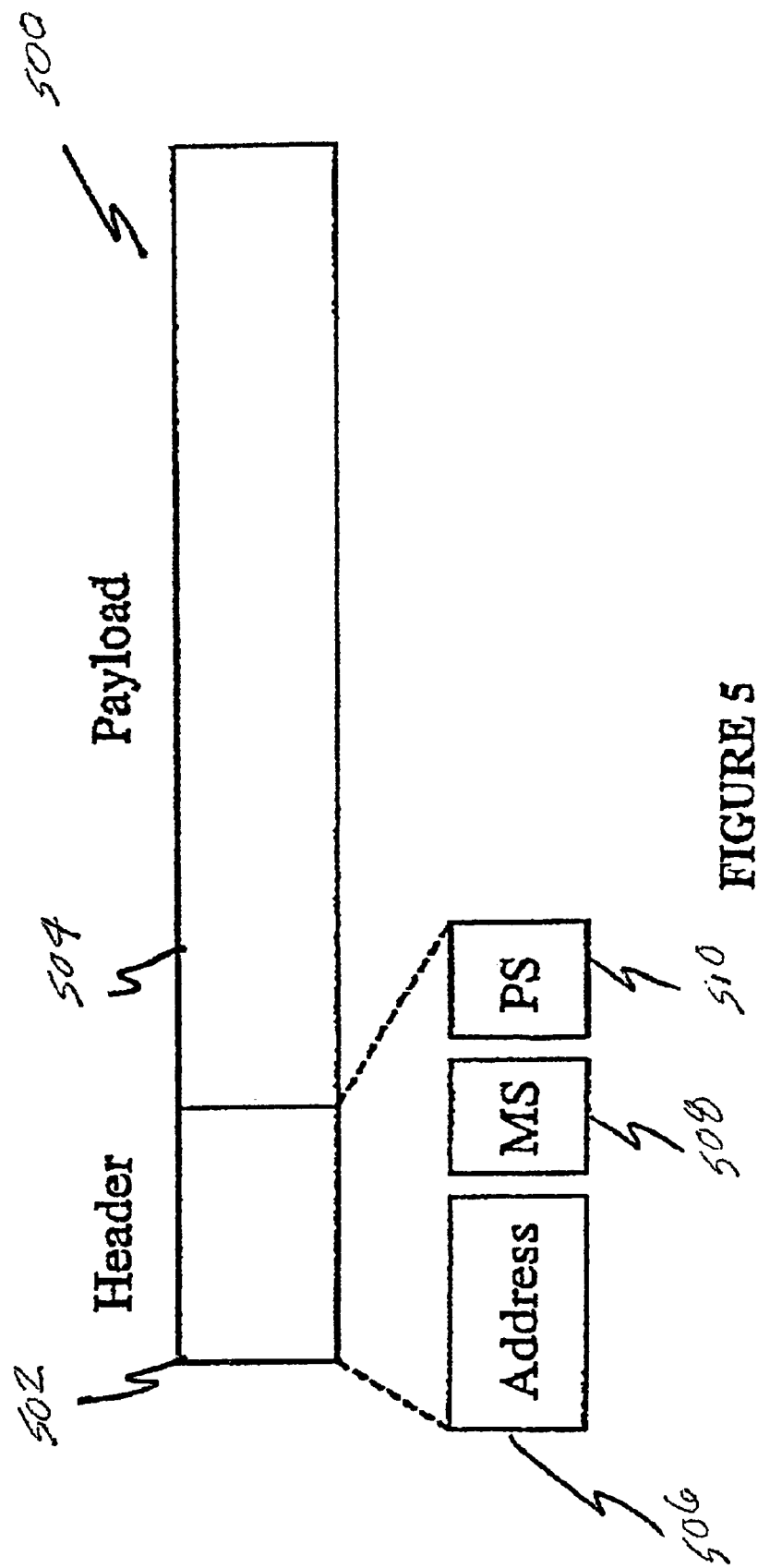
FIG. 5 depicts an exemplary embodiment of a packet format for implementing the claimed invention.

According to exemplary embodiments, a method and apparatus are provided for managing synchronous, isochronous, and asynchronous traffic flows integrated onto a common information carrier. This may be understood by referring to FIG. 1, in which exemplary synchronous 100, isochronous 102, and asynchronous 104 traffic flows are shown. Each of the traffic flow representations 100/102/104 show a stream of information which has been divided into segments 106 A, B, C, etc. The information in each segment 106 may be encapsulated into a packet 500, as shown in FIG. 5, having a header 502 and payload 504, which is transmitted over a common information carrying medium in a time slot 110. Packets 500, in turn, may comprise one or more data segments 106.

Figure 1:
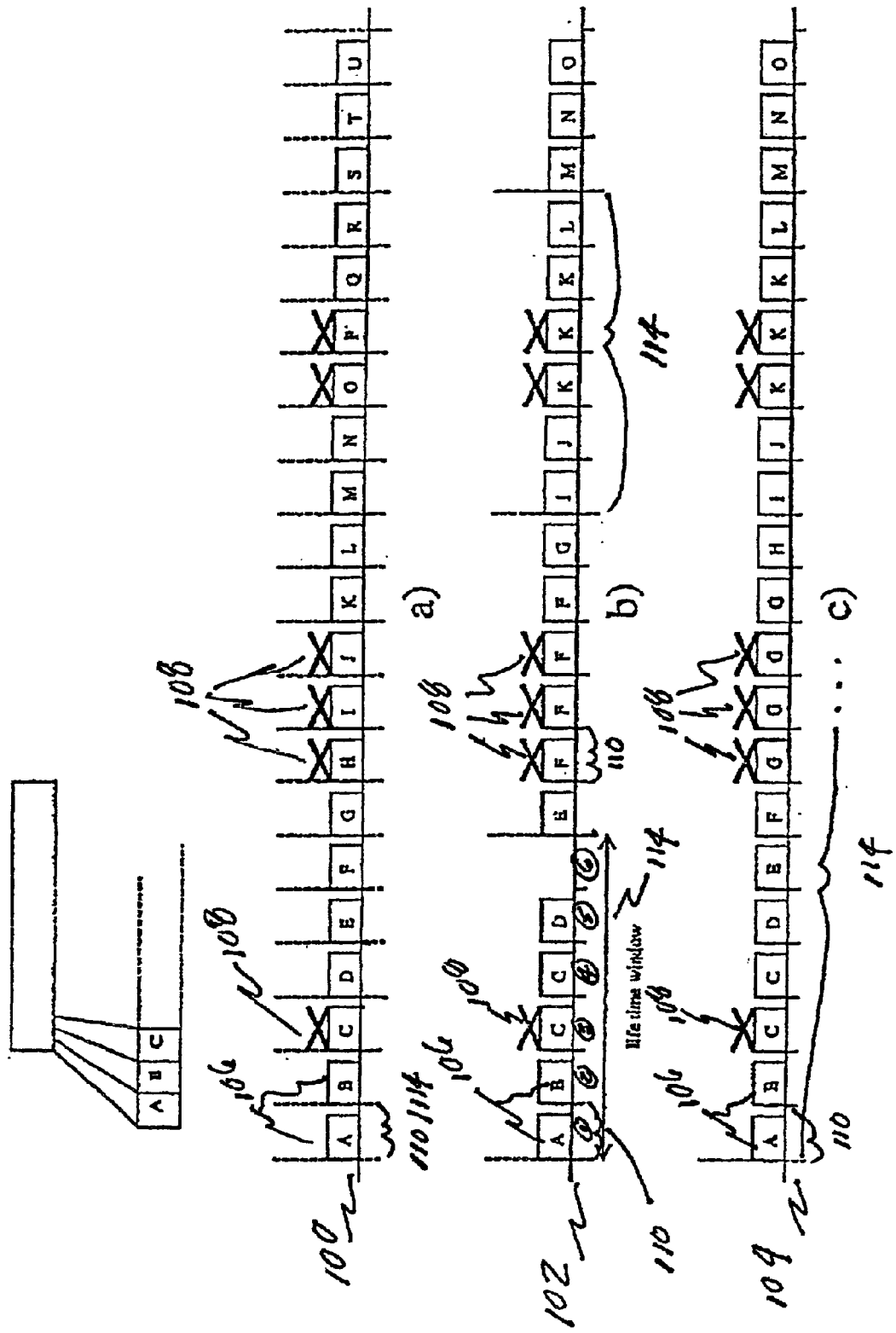
FIG. 1 depicts examples of synchronous, isochronous, and asynchronous traffic flows upon which the invention may be practiced.

In FIG. 1, all time slots 110 are assumed to be allocated to a same logical channel. Thus, each of the traffic flows 100/102/104 also represents a logical channel. Those skilled in the art, however, will appreciate that each of the segments 106 in the various traffic flows 100/102/104, and may be allocated to respective logical channels in the common information carrying medium.

Segment failures in the various traffic flows 100/102/104 of FIG. 1 are indicated by a cross 108 above the corresponding failed segments in the flow. Segment failures may be the result of a complete loss of the segment data, or from parity check failures as determined using FEC information or other redundant information sent in the flow. In the synchronous flow 100, each segment 106 is sent only once, as indicated by the various segments having unique identifiers A, B, C, etc. Errors 108 on the synchronous channel have no effect on the handling of segments, as the data recipient must accept all segments whether or not they are error-free.

Referring to the isochronous traffic flow 102 of FIG. 1, four segments 106 having the identifiers A, B, C, and D are considered. In the isochronous flow 102, six time slots 110 are available to transmit the four-segment message ABCD, one segment per time slot. The flow is isochronous since the lifetime window 114, corresponding to six time slots 110, exceeds the amount of time required to transmit the four-segment message ABCD, which is four time slots. This results in there being two additional time slots 110 in the lifetime window 114 of six time slots 110 to retransmit failed segments 108 in the four-segment message. An ARQ protocol may be applied to implement an automatic retransmission of any failed segments 108 in this message. For example, the ARQ protocol may be applied to have failed segment C, expected in time slot three of the lifetime window 114, to be re-transmitted in time slot four of the window 114, allowing segment D to be transmitted and received in either time slot five or six of the window 114.

If, however, all of the segments 106 of a four-segment message have not reached the recipient error-free after six time slots 110 have elapsed, the entire message must be discarded at the sender and a next four-segment message in the flow is considered. This situation is illustrated by a second message EFGH in isochronous flow 102, where there exists no available time slots 110 to send segment H, because three re-transmissions of failed segment F have expended all available time slots 110 in the lifetime window 114.

Referring now to the pure asynchronous traffic flow 104 of FIG. 1, it can be seen that the lifetime window 114 for the data segments 106 has increased to Infinity. This in turn allows for the retransmission of segments 106 for failed segments 108 to be repeated indefinitely until a successful delivery of the segment 106 has been confirmed by the recipient.

The ARQ protocol illustrated in FIG. 1 corresponds to a so-called stop-and-wait protocol. That is, when errors 108 in the traffic flows 100/102/104 are detected by the data recipient, the data sender "stops" transmission of the next segment 106 (e.g. segment D in the message ABCD of flow 102) in the message, and "waits" to transmit this new segment until a previous failed segment 108 (e.g., segment C in the message ABCD of flow 102) in the current message is successfully delivered to the recipient. The stop-and-wait ARQ protocol is a relatively simple protocol, particularly suited for illustration purposes. The skilled artisan will appreciate, however, that more complex retransmission schemes, such as those using the go-back-N and selective-repeat ARQ protocols, may be employed. Use of the latter, selective-repeat protocol is discussed in further detail below.

To support any these arbitrary ARQ schemes, each segment in a respective traffic flow 100/102/104 is assigned a sequence number that indicates the order of the segment in a sequence of consecutive segments 106 forming a larger block of information, e.g., a message. In order to minimize overhead, it is preferred that a binary representation of the sequence number comprise a limited number of bits. Limiting the number of bits, in turn requires that the assigning of sequence number be cyclic, or repeating. For example, if the sequence number comprises m bits, the range of available sequence numbers is from 0 to $2^m-1$. In such an example, each respective sequence number in the available range would have to be reused every $2^m$ segments. Thus, the sequencing of segments can be thought to proceed according to modulo $2^m$.

In the limiting cases, the sequencing of segments 106 is relatively straightforward. For example, in pure synchronous traffic flows (e.g., flow 100 of FIG. 1), the sequencing of segments is of no importance, since the flow of segments itself defines the segment sequence. In such synchronous traffic flows, the sequencing of the segments can be ignored. Likewise, in pure asynchronous traffic flows (e.g., flow 104 of FIG. 1), the sequencing of segments may be thought of as being cyclic process, wherein the same sequence number may be reused after groups of $2^m$ segments are successfully received.

The assigning of sequence numbers for the segments of isochronous traffic flows (e.g., flow 102 of FIG. 1) is not so straightforward. Unlike the limiting cases discussed above, the ARQ scheme in an isochronous flow must operate over the limited lifetime window 114 of the flow, and must be restarted each time the lifetime 114 expires. When exchanging information in isochronous flows, the data recipient must not only be informed when a previous window is discarded, but must also be informed whenever the ARQ scheme is to be re-initiated. As a consequence, the sequence number alone may not be sufficient in an isochronous flow to support the retransmission protocol.

This is particularly true when the ARQ protocol employed to initiate the retransmissions is based on a selective-repeat ARQ scheme. In a selective-repeat ARQ scheme, segments are dispatched in an out-of-order fashion. This combination of out-of-order transmissions, coupled with the repetitive nature of the isochronous traffic flow, makes it particularly difficult to implement a reliable ARQ scheme. This is because in an isochronous traffic flow, the sequence numbering may jump both because of the discarding of out-dated segments and due to selected re-transmissions. Therefore, any ARQ scheme employed in an isochronous flow should not mistake re-transmissions for restarts due to the isochronous behavior of the data flow.

To better support the ARQ scheme in isochronous traffic, a second layer of sequencing is proposed. To illustrate this additional layer of sequencing, an exemplary embodiment is presented in FIG. 2, in which the isochronous traffic flows 200/202 are divided into messages 204/205. Each message 204/205 has a finite lifetime 206, and is divided into segments 208. The segments 208 of a message 204/205 can be transmitted and re-transmitted whenever errors 210, designated by Xs in the figure, occur in the flow, until the time when the lifetime 206 of the corresponding message 204/205 expires. Should the lifetime 206 of a current message 204 expire, the message 204 (and all its segments 208) is discarded, and a next message 205 in the flow 200/202 is considered.

According to the exemplary embodiment, the messages 204/205 are identified by a message number (MS) 212, while the segments 208 in the flows 200/202 are identified by a segment number (PS) 214. The PS 214 is used as the sequence number in the ARQ scheme for the flows 200/202. The PS 214 is incremented each time a new segment 208 is released into the flows 200/202. For each new message 205, the MS 212 is incremented, and the PS 214 is reset (corresponding to a new lifetime window 206). To receive a message 204/205 from the flow, the recipient of the data may gather all segments 208 having the same MS 212, since these segments 208 all belong to the same message 204/205. Segment ordering in the message 204 is indicated by the PS 214. Whenever the MS 212 changes, a new message 205 is created, irrespective of whether all of the segments 208 of the previous message 204 have been received error-free. By monitoring the MS 212 numbering separately from the PS 214 numbering, the ARQ scheme can differentiate between the retransmission of a message 204/205, and the start of a new message 205, even if the segments 208 arrive out of order.

Figure 2:
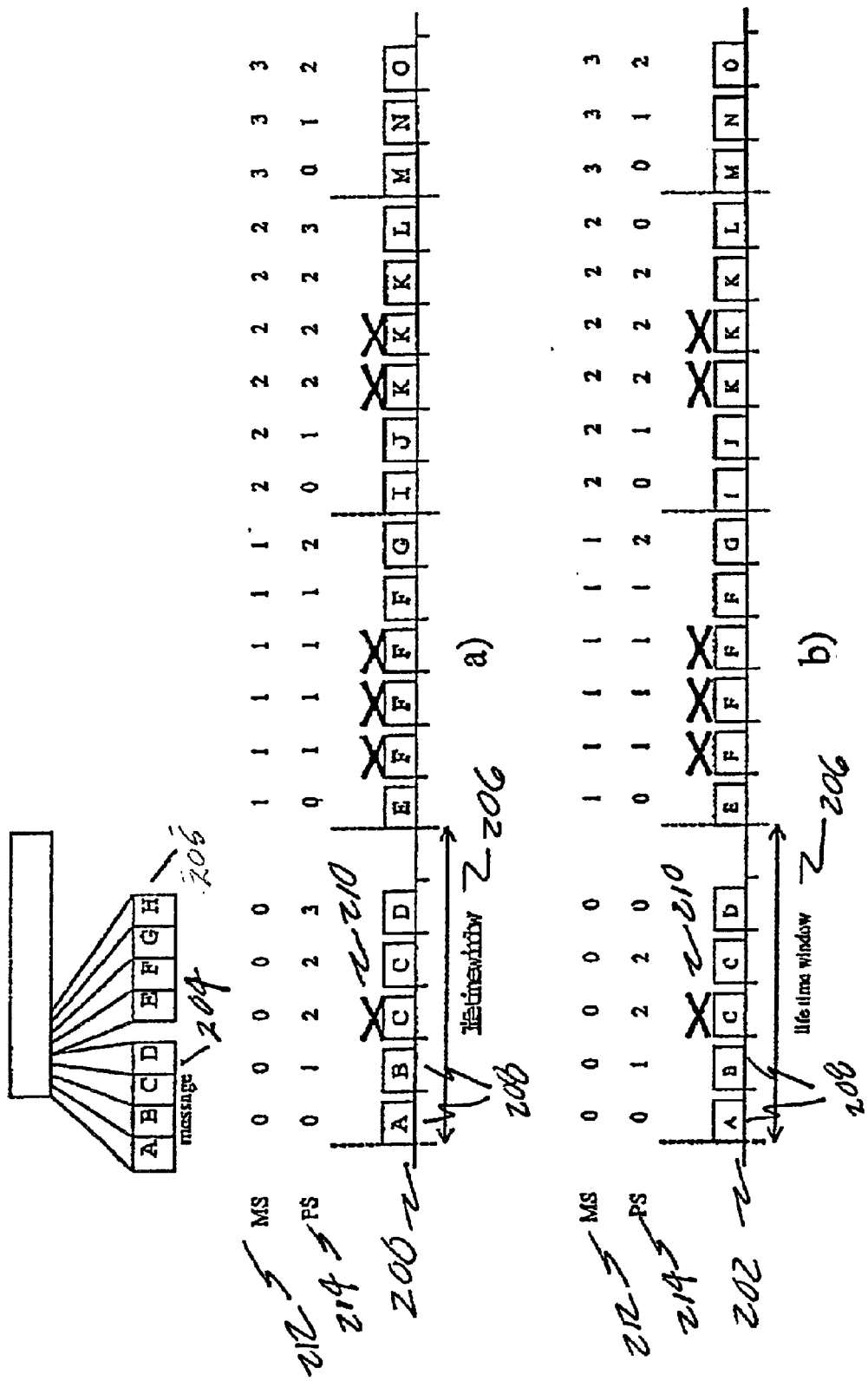
FIG. 2 depicts examples of isochronous traffic flows including an ARQ scheme according to the claimed invention.

In FIG. 2, a first example sequencing is given in flow 200 where MS 212 is incremented by steps of modulo 4, and PS 214 is incremented by steps of modulo 4. The message 204 is divided into four segments, A, B, C, and D. Also in FIG. 2, a second example sequencing is provided wherein the PS 214 is incremented by steps of modulo 3. Again, a stop-and-wait ARQ protocol is illustrated in each of the flows 200/203 to aid in the understanding of the invention. Those skilled in the art will appreciate that more complex ARQ protocols may be employed.

In referring to the flows 200/202 shown in FIG. 2, it can be seen that a data recipient can distinguish a new transmission segment from a retransmission segment (even when the segments 208 have the same PS 214) by monitoring for changes in the MS 212. The recipient can thus collect all segments 208 having the same MS 212 in order to build a message 204/205, and can then derive from the PS 214 whether all segments of the message 204/205 have been received.

For example, in the flow 200, the data recipient can receive the segments 208, the MS 212, and the PS 214 for the message 204 corresponding to message ABCD from the isochronous flow 200. Segments A and B are transmitted having the MS/PS pairs 0/0 and 0/1, respectively, indicating that these segments are part of the same message (MS=0), and that the segments represent the first (PS=0) and second (PS=1) segments in this common message. Next, the segment C is transmitted and is determined to be erroneous by the recipient through FEC or other types of parity checking. Since the lifetime window 206 for the messages 204/205 transferred over the flow 200 has a duration of six time slots, and the length of the message ABCD is only four time slots, the sender of the message can resend segment C onto the flow 200 using an appropriate ARQ scheme. The correct segment C is then transmitted by the recipient with the MS/PS pair 0/2, indicating that this segment is part of the same message as received segments A and B, and that segment C follows segment B in the message. Finally, segment D is transmitted having the MS/PS pair 0/3, indicating again that the received segment is part of the same message as segments A, B, and C, and that segment D is the last segment in the message.

After properly receiving all four segments of the message, the message is then assembled in the proper order according to the sequence defined by PS 214. The MS 212 is then incremented and the PS 214 reset by the sender in anticipation of sending the next message 205 in the flow.

The next message 205 in the flow 200 is message EFGH. The first segment, segment E, is transmitted having the MS/PS pair 1/0, indicating that this segment is the first segment (PS=0) of a new message (MS=1). Three erroneous segments F are then transmitted, each having the MS/PS pair 1/1, indicating the segment is the second segment (PS=1) in the second message (MS=1). Again the FEC parity checking may trigger an ARQ scheme to request the re-transmission of segment F. Finally, valid segment F is transmitted at the next time slot having the same MS/PS pair 1/1. Segment G is then transmitted having the MS/PS pair 1/2, indicating that the segment is the third segment (PS=2) in the second message (MS=1). The next segment H cannot be successfully transmitted, however, because doing so would exceed the lifetime window 206 for the message. As a result, the sender discards all segments associated with the current message, and informs the recipient that the message EFGH has been discarded.

Figure 3:
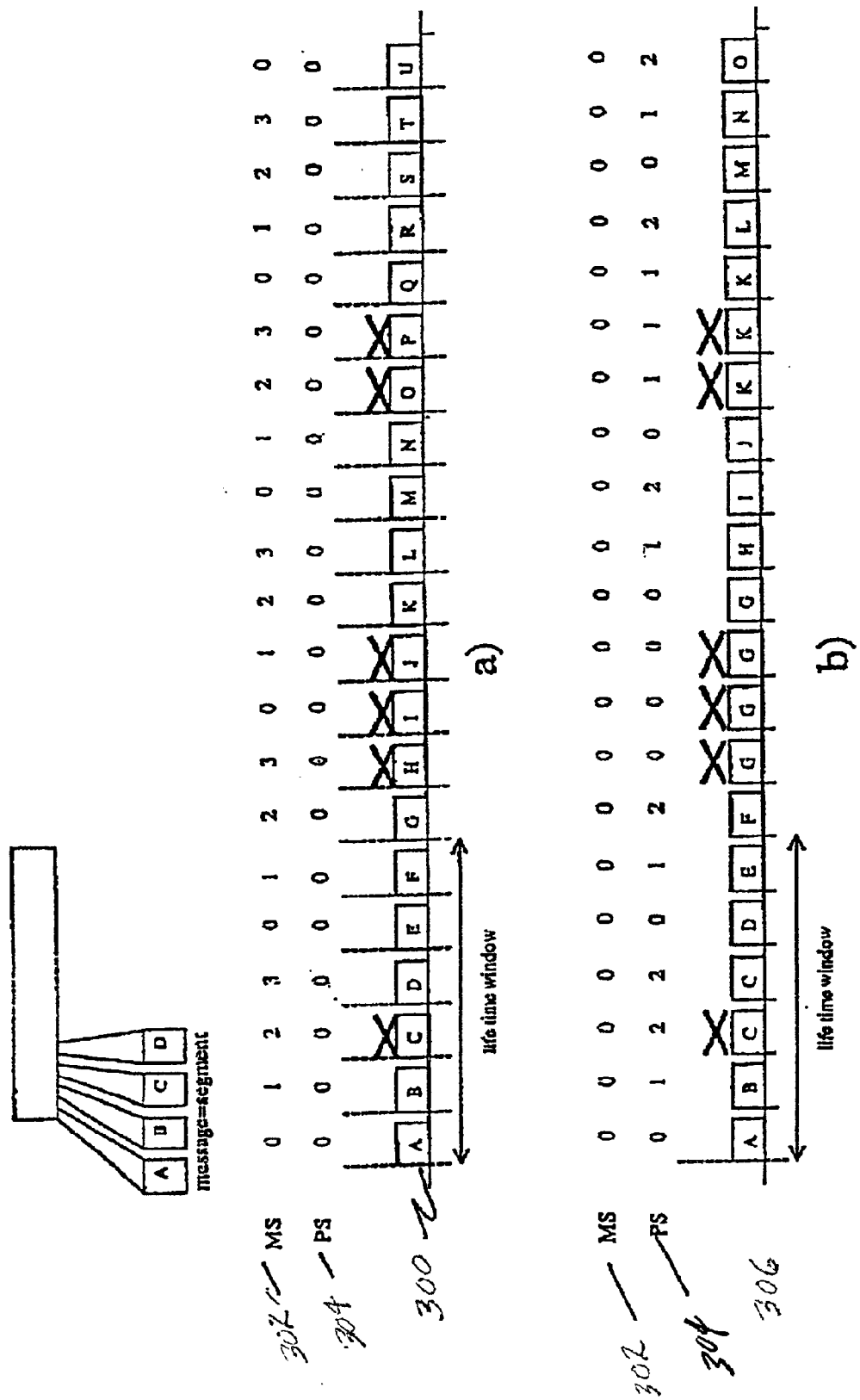
FIG. 3 depicts synchronous and asynchronous traffic flows including an ARQ scheme according to the claimed invention.

The MS and PS sequence numbers described above can be used in a flexible manner to support the more straightforward synchronous and asynchronous traffic flows. For example, in the synchronous traffic flow 300 of FIG. 3, the message length is reduced to one segment, resulting in the MS 302 being incremented for each new segment released into the synchronous traffic flow, while the PS 304 never changes. For an asynchronous traffic flow, such as the flow 306 shown in FIG. 3, the MS 302 is never incremented, while the PS 304 continually cyclically increases.

In yet another exemplary embodiment, the boundaries of the lifetime windows in an isochronous traffic flow can be dynamically changed in order to perhaps exploit the available bandwidth in the so-called "silence periods" of a channel. This concept is illustrated by the isochronous flow 400 shown in FIG. 4. This figure shows a dynamically changing lifetime window 402, the width of which may vary around an average of six time slots. The width of the lifetime window can be dynamically changed to be shorter than six time slots, as in the first message ABCD (where all segments have been successfully delivered, and there exist excess time slots), or longer as in the second message EFGH (when extra re-transmissions must be carried out as a result segment loss). In the example shown in the figure, because the message consists only of four segments and the average lifetime window 402 for the flow is equal to six time slots, the window may be allowed to vary anywhere between four and eight time slots, as long as the average lifetime window remains equal to six time slots.

Figure 4:
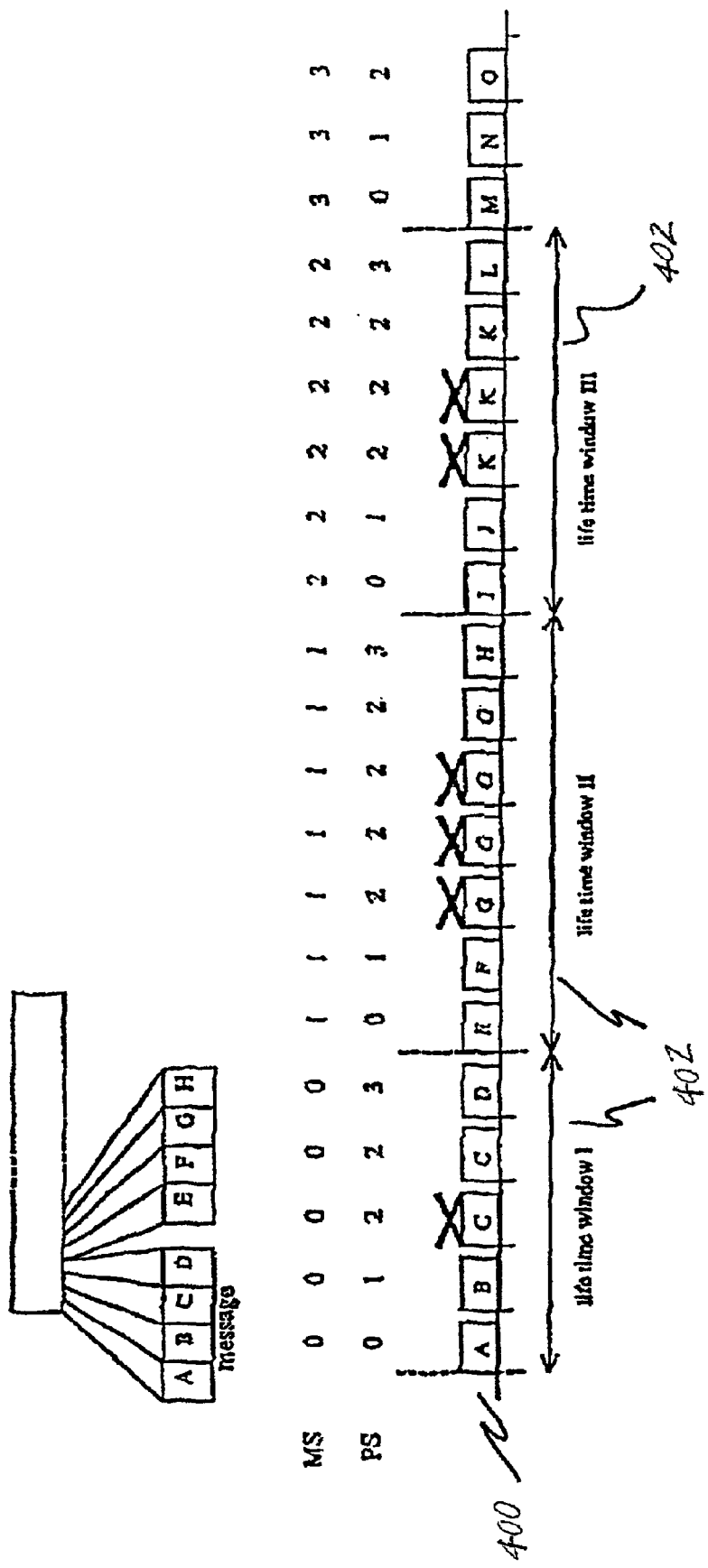
FIG. 4 depicts the variable time windows in an isochronous traffic flow having an ARQ scheme according to the claimed invention.

Comparing the isochronous flows of FIGS. 2 and 4, it can be seen that in the dynamically alterable configuration shown in FIG. 4, unused time slots for previously received messages can be reserved for later use by the system when messages are received having numerous errors. For example, in the flow 200 of FIG. 2, it has been shown that the message EFGH must be discarded, as the segment H cannot be received within the lifetime window as a result of numerous re-transmissions of segment F. In the flow 400 of FIG. 4, however, because the message ABCD was successfully received in only five time slots, the sixth time slot for the lifetime window corresponding to message ABCD could be reserved for later use. This reserved time slot can then be added to the lifetime window corresponding to message EFGH, allowing the message to be successfully received, despite the numerous times segment F was re-transmitted.

According to an exemplary embodiment, the PS and MS sequence numbers are preferably stored in a header 502 of a packet 500 as is shown in FIG. 5. As discussed above, a general packet format consists of a header 502 and a payload 504. The header 502 may be preceded by a preamble to facilitate demodulation. The header 502 contains address 506 and control information like the MS 508 and PS 510 fields.

In an alternative exemplary embodiment, the MS sequence number may be stored in a frame header associated with each message, thereby eliminating the need to repeatedly store the MS sequence number in each of the segments that comprise a respective message. Such an arrangement would be best suited for communication systems employing point-to-point connections. Recall that in previously described embodiments, it was the transmitter that indicated that the message lifetime for a given message had expired by changing the MS sequence number in a transmitted segment. Because, in this alternative embodiment, the MS sequence number would no longer be included in each transmitted segment, a mechanism must be added at the receiver to determine when the message lifetime for a given message has expired.

One approach would be to include a message timer at the receiver that is reset each time a frame header having a new MS sequence number arrives. If the message timer expires before a frame header having a new message number has arrived, all segments for a current message being assembled are discarded. FEC parity checking or some other method may be used trigger an ARQ scheme to request a re-transmission of segment not properly received as long as the message timer for the current message has not expired.

To avoid ambiguity in the segment numbering when using a selective-repeat ARQ scheme, it is preferable to choose the number of bits used to define the segment number sequence based on the length of a transmit and a receive buffer used to temporarily store the transmitted and received data segments, respectively. If, for example, the length of the transmit and receiver buffers is equal to a number, N, the number of bits is preferably chosen, such that the range of available sequence numbers lies between 0 and 2N-1. Having 2N unique segment numbers to be assigned to the segments of a given message allows the transmit and receive buffers to be completely misaligned without introducing ambiguity into the received data.

The MS sequence, however, may be much shorter than the PS sequence. In principle, the MS sequence may be defined by only one bit, which is inverted for each newly arriving message. A larger MS sequence, however, reduces the possibility of errors occurring in the message sequencing. Such errors can occur when the message lifetime is short. For example, a complete message may be destroyed, in turn causing the next message in the flow to be discarded, as the receiver may be unable to detect a change in the MS value, thus mistaking the next message in the flow for a retransmission.

Figure 6:
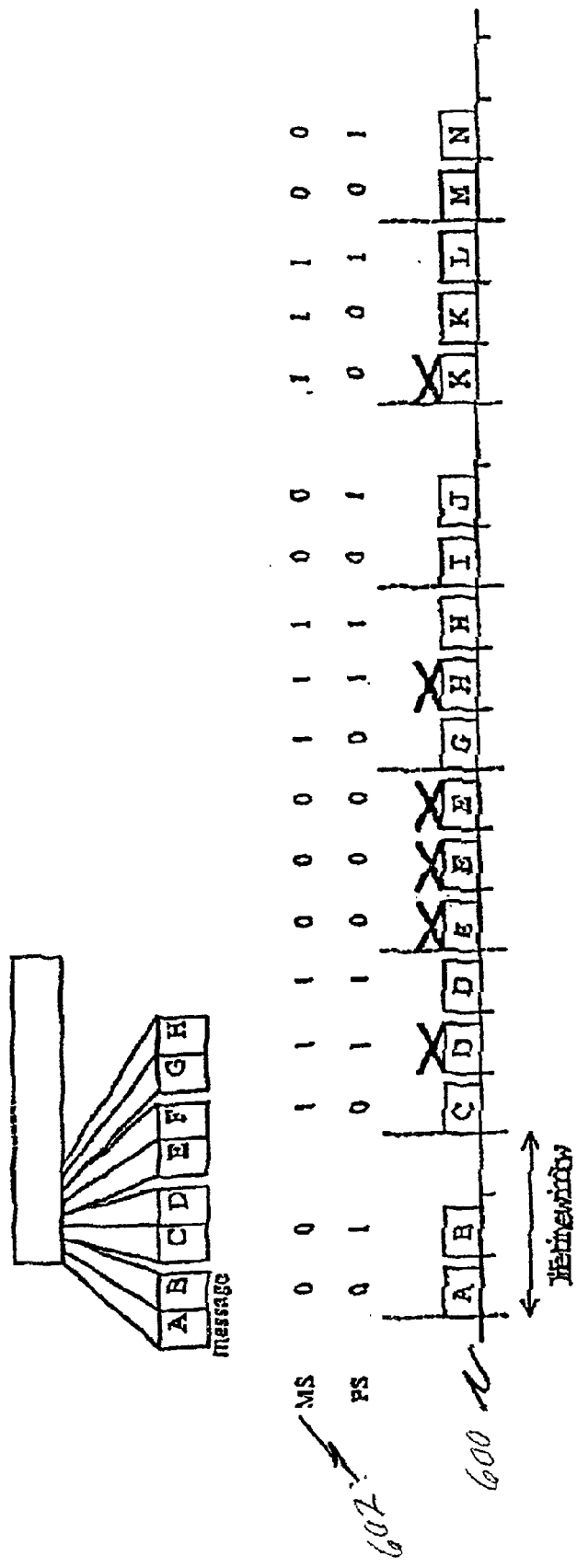
FIG. 6 depicts an exemplary embodiment of a double message error when the number of bits defining the message number is low.

An example of this problem is shown in FIG. 6, which depicts an isochronous flow using a single-bit MS 602. In the example, the message EF is completely destroyed (including both the MS and PS sequence numbers). As a consequence, the recipient will not "see" a difference between the messages CD and GH, as the recipient will mistake the message GH for re-transmissions of the message CD. This problem may occur even if the message CD were received correctly by the recipient as a result of errors in the confirmation (or acknowledgment) information returned to the sender upon receipt of the message. The likelihood of these so-called "double message" error problems occurring can be dramatically reduced by using a MS sequence number having two or more bits.

Figure 7:
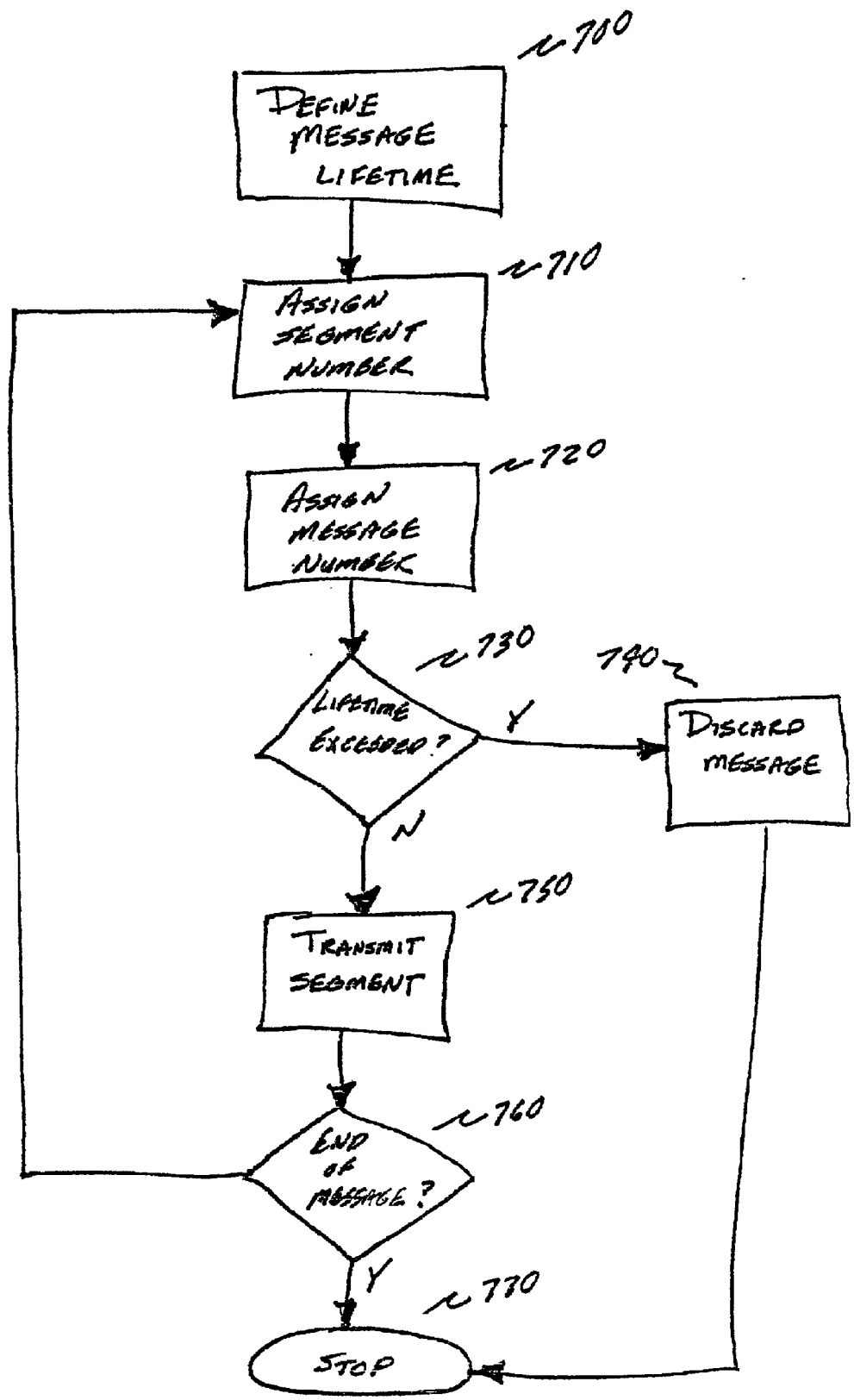
FIG. 7 depicts a flowchart describing an exemplary method for transmitting segmented data messages.

FIG. 7 shows a flowchart of an exemplary method for transmitting segmented data messages. The method begins at step 700 by defining a message lifetime for a respective message. Next, at step 710, a segment number is assigned to each segment of a same message in an order of a predefined sequence of segment numbers. The predefined sequence may be generated, e.g., by a modulo 4 or modulo 3 counter as discussed above. The segment number defines the position of a corresponding segment within the same message, and is used by a recipient to reconstruct the segmented message. The segment number is also used by the ARQ scheme to initiate a retransmission of erroneously received segments. Finally, the segment number may be reset to the beginning of the sequence whenever the message lifetime is reached.

Next, at step 720, a message number is assigned to each of the messages, again in an order of a predefined sequence of message numbers. The same message number is assigned to every segment forming a respective message. At step 730, a determination is made as to whether the time associated with the transmission of segments already transmitted for a respective message equals or exceeds the message lifetime. If the message lifetime has been reached, then all segments for the respective message are discarded at step 740 and the process ends at step 770.

If, however, at step 730 it is determined that the time associated with the transmission of segments already transmitted for a respective message plus the time associated with transmitting the next segment of the message equals or is less than the message lifetime, then the next segment is transmitted over the medium at step 750 with the assigned segment and message numbers being transmitted along with the segment. Next, a determination is made at step 760 whether all segments associated with a respective message have been successfully transmitted. If they have, the process ends for a respective message at step 770. If all segments for a given message have not been successfully transmitted, however, the process of transmitting the message segments continues from step 710. The process shown in FIG. 7 is repeated for each respective message of a traffic flow.

Figure 8:
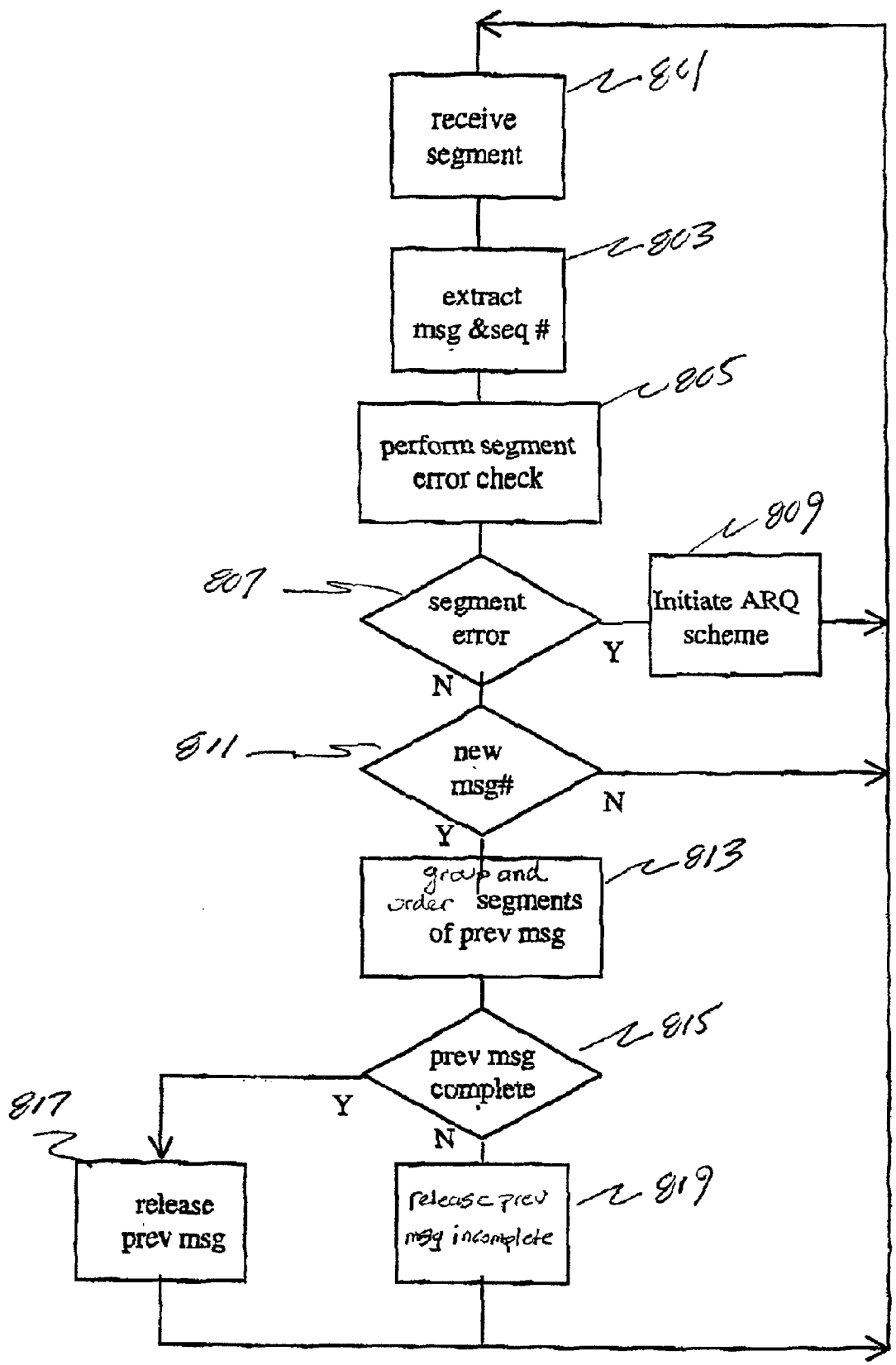
FIG. 8 depicts a flowchart describing an exemplary method for receiving segmented data messages.

FIG. 8 shows a flowchart of an exemplary method for receiving segmented data messages where the data segments include both a message and a segment sequence number. The method begins at step 801 with the receiving of a message segment. Next, both the message and segment sequence numbers are extracted from the received segment at step 803. The process continues at step 805, where error checking is performed on the received segment. As discussed above, additional information may be added to the segments during transmission in order to facilitate the error checking. The additional information may be used to perform parity checks, CRC checks, or other conventional error checking routines on the received segment. If a segment error is detected at step 807, an ARQ scheme is initiated at step 809 to request a retransmission of the erroneous segment. The ARQ scheme uses the segment number extracted at step 803 to identify the segment that is to be re-transmitted.

If no errors are detected at step 807, the process continues at step 811 where a determination is made as to whether the message number of the received segment is different than the message number of an immediately preceding received segment. If the message numbers are the same, the process returns to step 801 where another data segment is received. If, however, it is determined at step 811 that the message number of the received segment is different than the message number of an immediately preceding received segment, the received segment is grouped with other received segments having the same message number, and then ordered according to the extracted segment number to properly assemble the transmitted message.

A determination is next made, e.g., using FEC coding, at step 815 as to whether the transmitted message was received completely. If it is determined that the transmitted message was received completely, the message is released at step 817. If the message was not received completely, the message released at step 819 with an indication that the message is not complete. The released message may be deleted when there exists an indication that the message is incomplete. In either case, the process returns to step 801 to receive the next arriving data segment.

It should be emphasized that the terms "comprises" and "comprising", when used in this specification as well as the claims, are taken to specify the presence of stated features, integers, steps or components; but the use of these terms does not preclude the presence or addition of one or more other features, integers, steps, components or groups thereof.

The various aspects of the invention have been described in connection with a number of exemplary embodiments. To facilitate an understanding of the invention, many aspects of the invention were described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

The invention has been described with reference to particular embodiments. However, it will be readily apparent to those skilled in the art that it is possible to embody the invention in specific forms other than those of the preferred embodiments described above. This may be done without departing from the spirit of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for transferring a plurality of messages over a common information carrying medium, each message having at least one segment, the method comprising the steps of:

defining a message lifetime for each of the respective messages;

assigning a respective segment number to each segment of a same message in order of a predefined sequence of segment numbers, the segment number defining a position of a corresponding segment within the same message;

assigning a respective message number to each of the messages in order of a predefined sequence of message numbers, each message number being assigned to at least one segment of a same message; and transmitting at least one segment for each respective message over the medium at least once having any assigned segment and message numbers included therein until the message lifetime associated with the respective message expires.

2. The method of claim 1, wherein at least one of the transmitted segments is a re-transmitted segment that had not been correctly received during a previous transmission.

3. The method of claim 2, wherein the at least one re-transmitted segment is transmitted in response to an automatic retransmission query scheme based on the assigned segment number.

4. The method of claim 3, wherein the automatic retransmission query scheme employs one of a stop-and-wait protocol, a go-back-N protocol, and a selective-repeat protocol.

5. The method of claim 2, wherein the at least one re-transmitted segment is determined to have been not correctly received using at least one of forward error correcting parity bits and redundant information added to the transmitted segments.

6. The method of claim 1, further comprising the step of resetting the predefined sequence of segment numbers such that a first segment in each respective message is assigned the first segment number in the sequence of segment numbers.

7. A method for transferring a plurality of messages over a common information carrying medium, each message having at least one segment, the method comprising the steps of:

defining a message lifetime for the respective message;

assigning a respective segment number to each segment of a same message in order of predefined of sequence of segment numbers, the segment number defining a position of a corresponding segment within the same message;

assigning a respective message number to each of the messages in order of a predefined sequence of message numbers, each message number being assigned to at least one segment of a same message;

transmitting at least one segment for each respective message over the medium at least once having any assigned segment and message numbers included therein until the message lifetime associated with the respective message expires; and dynamically changing the message lifetime when the time associated with a successful transmission of at least one previously transmitted message is different than the message lifetime.

8. The method of claim 1, further comprising the step of discarding all segments of a respective message when the time associated with the transmission of segments already transmitted for a respective message exceeds the message lifetime.

9. The method of claim 1, further comprising the steps of:

receiving transmitted segments;

extracting the message and segment numbers from the received segments;

performing error checking to detect errors in the received segments;

initiating an automatic retransmission query scheme when an erroneous segment is detected to request a retransmission of the erroneous segment;

comparing a current message number with a preceding message number of an immediately preceding received segment;

grouping and ordering the received segments to form a message, using the extracted message and segment numbers, respectively, when the current message number does not match the preceding message number;

determining if the message has been received completely;

releasing the message when received completely; and releasing the message including an indication that the message is incomplete when the message has not been received completely.

10. The method of claim 9, wherein the automatic retransmission query scheme uses the segment number to identify the erroneous segment.

11. The method of claim 1, wherein the message lifetime is substantially equal to the time associated with the transmission of one segment, whereby a synchronous transmission is performed.

12. The method of claim 1, wherein the message lifetime is greater than the time associated with the transmission of all segments of a respective message, whereby an isochronous transmission of the message is performed.

13. The method of claim 1, wherein the message lifetime is infinite, whereby an asynchronous transmission is performed.

14. The method of claim 1, wherein the transmitted segments are carried over the medium within packets, each packet comprising a payload for storing a respective segment, and a header for storing the assigned segment and message numbers of the respective segment.

15. The method of claim 1, wherein the message number includes a binary number having two or more bits.

16. A method for transferring a plurality of messages over a common information carrying medium each, message having at least one segment, the method comprising the steps of:
defining a message lifetime for each of the respective messages;
assigning a respective segment number to each segment of a same message in order of a predefined sequence of segment numbers, the segment number defining a position of a corresponding segment within the same message;
assigning a respective message number to each of the messages in order of a predefined sequence of message numbers, each message number being assigned to at least one segment of a same message; and
transmitting at least one segment for each respective message over the medium at least once having any assigned segment and message numbers included therein until the message lifetime associated with the respective message expires;
wherein the number of segment numbers in the sequence of segment numbers satisfies the relationship 2N−1, where N is equal to the number of segments that can be transmitted within the message lifetime.

17. The method of claim 1, wherein a message number is assigned to only a frame header segment for each respective message.

18. The method of claim 17, further comprising the steps of:
receiving transmitted segments, including frame header segments;
extracting the segment numbers from the received segments, and the message numbers from the received frame header segments;
performing error checking to detect errors in the received segments;
initiating an automatic retransmission query scheme when an erroneous segment is detected to request a retransmission of the erroneous segment;
comparing a current message number of a received frame header segment with a preceding message number of an immediately preceding received frame header segment;
resetting a message lifetime counter when the current message number does not match the preceding message number;
ordering the received segments to form a message using the extracted segment when the message lifetime counter is reset;
determining if the message has been received completely;
releasing the message when received completely; and
releasing the message including an indication that the message is incomplete when the message has not been received completely.

19. The method of claim 18, further comprising the step of:
deleting the released message when there is an indication that the message is incomplete.

20. The method of claim 18, further comprising the step of:
discarding received segments of a respective message when the message lifetime counter exceeds a message lifetime associated with the respective message before a frame header having a new message number is received.

21. The method of claim 1, further comprising the step of:
discarding untransmitted segments of a respective message when the message lifetime associated with the respective message expires.

22. An apparatus for transferring a plurality of messages over a common information carrying medium, each message having at least one segment, the apparatus comprising:
logic that defines a message lifetime for each of the respective messages;
logic that assigns a respective segment number to each segment of a same message in order of a predefined sequence of segment numbers, the segment number defining a position of a corresponding segment within the same message;
logic that assigns a respective message number to each of the messages in order of a predefined sequence of message numbers, each message number being assigned to every segment of a same message; and
a transmitter for transmitting at least one segment for each respective message over the medium at least once having the assigned segment and message numbers included therein until the message lifetime associated with the respective message expires.

23. The apparatus of claim 22, wherein at least one of the transmitted segments includes a re-transmitted segment that had not been correctly received during a previous transmission.

24. The apparatus of claim 23, wherein the at least one re-transmitted segment is transmitted in response to an automatic retransmission query scheme based on the assigned segment number.

25. The apparatus of claim 24, wherein the automatic retransmission query scheme employs one of a stop-and-wait protocol, a go-back-N protocol, and a selective-repeat protocol.

26. The apparatus of claim 23, wherein the at least one re-transmitted segment is determined to have been not correctly received using at least one of forward error correcting parity bits and redundant information added to the transmitted segments.

27. The apparatus of claim 22, further comprising logic that resets the predefined sequence of segment numbers such that a first segment in each respective message is assigned the first segment number in the sequence of segment numbers.

28. An apparatus for transferring a plurality of messages over a common information carrying medium, each message having at least one segment, the apparatus comprising:
logic that defines a message lifetime for each of the respective messages;
logic that assigns a respective segment number to each segment of a same message in order of a predefined sequence of segment numbers, the segment number defining a position of a corresponding segment within the same message;

logic that assigns a respective message number to each of the messages in order of a predefined sequence of message numbers, each message number being assigned to every segment of a same message;

a transmitter for transmitting at least one segment for each respective message over the medium at least once having the assigned segment and message numbers included therein until the message lifetime associated with the respective message expires; and logic that dynamically changes the message lifetime when the time associated with a successful transmission of at least one previously transmitted message is different than the message lifetime.

29. The apparatus of claim 22, further comprising logic that discards all segments of a respective message when the time associated with the transmission of segments already transmitted for a respective message exceeds the message lifetime.

30. The apparatus of claim 22, further comprising:

a receiver for receiving transmitted segments;

logic that extracts the message and segment numbers from the received segments;

logic that performs error checking to detect errors in the received segments;

logic that initiates an automatic retransmission query scheme when an erroneous segment is detected to request a retransmission of the erroneous segment;

logic that compares a current message number with a preceding message number of an immediately preceding received segment;

logic that groups and orders the received segments to form a message, using the extracted message and segment numbers, respectively, when the current message number does not match the preceding message number;

logic that determines if the message has been received completely;

logic that releases the message when received completely; and logic that releases the message including an indication that the message is incomplete when the message has not been received completely.

31. The apparatus of claim 30, wherein the automatic retransmission query scheme uses the segment number to identify the erroneous segment.

32. The apparatus of claim 22, wherein the message lifetime is substantially equal to the time associated with the transmission of one segment, whereby a synchronous transmission is performed.

33. The apparatus of claim 22, wherein the message lifetime is greater than the time associated with the transmission of all segments of a respective message, whereby an isochronous transmission of the message is performed.

34. The apparatus of claim 22, wherein the message lifetime is infinite, whereby an asynchronous transmission is performed.

35. The apparatus of claim 22, wherein the transmitted segments are carried over the medium within packets, each packet comprising a payload for storing a respective segment, and a header for storing the assigned segment and message numbers of the respective segment.

36. The apparatus of claim 22, wherein the message number includes a binary number having two or more bits.

37. An apparatus for transferring a plurality of messages over a common information carrying medium, each message having at least one segment, the apparatus comprising:

logic that defines message lifetime for each of the respective messages;

logic that assigns a respective segment number to each segment of a same message in order of a predefined sequence of segment numbers, the segment number defining a position of a corresponding segment within the same message;

logic that assigns a respective message number to each of the messages in order of a predefined sequence of message numbers, each message number being assigned to every segment of a same message; and a transmitter for transmitting at least one segment for each respective message over the medium at least once having the assigned segment and message numbers included therein until the message lifetime associated with the respective message expires;

wherein the number of segment numbers in the sequence of segment numbers satisfies the relationship 2N−1, where N is equal to the number of segments that can be transmitted within the message lifetime.

38. The apparatus of claim 22, wherein a message number is assigned to only a frame header segment for each respective message.

39. The apparatus of claim 38, further comprising:

a receiver for receiving transmitted segments, including frame header segments;

logic that extracts the segment numbers from the received segments, and the message numbers from the received frame header segments;

logic that performs error checking to detect errors in the received segments;

logic that initiates an automatic retransmission query scheme when an erroneous segment is detected to request a retransmission of the erroneous segment;

logic that compares a current message number of a received frame header segment with a preceding message number of an immediately preceding received frame header segment;

logic that resets a message lifetime counter when the current message number does not match the preceding message number;

logic that orders the received segments to form a message using the extracted segment when the message lifetime counter is reset;

logic that determines if the message has been received completely;

logic that releases the message when received completely; and logic that releases the message including an indication that the message is incomplete when the message has not been received completely.

40. The apparatus of claim 39, further comprising logic that deletes the released message when there is an indication that the message is incomplete.

41. The apparatus of claim 39, further comprising logic that discards received segments of a respective message when the message lifetime counter exceeds a message lifetime associated with the respective message before a frame header having a new message number is received.

42. The apparatus of claim 22, further comprising logic that discards untransmitted segments of a respective message when the message lifetime associated with the respective message expires.

* * * * *